July 31, 1956
K. E. APPERT
2,757,333
PILOT REGULATOR
Filed Dec. 22, 1953
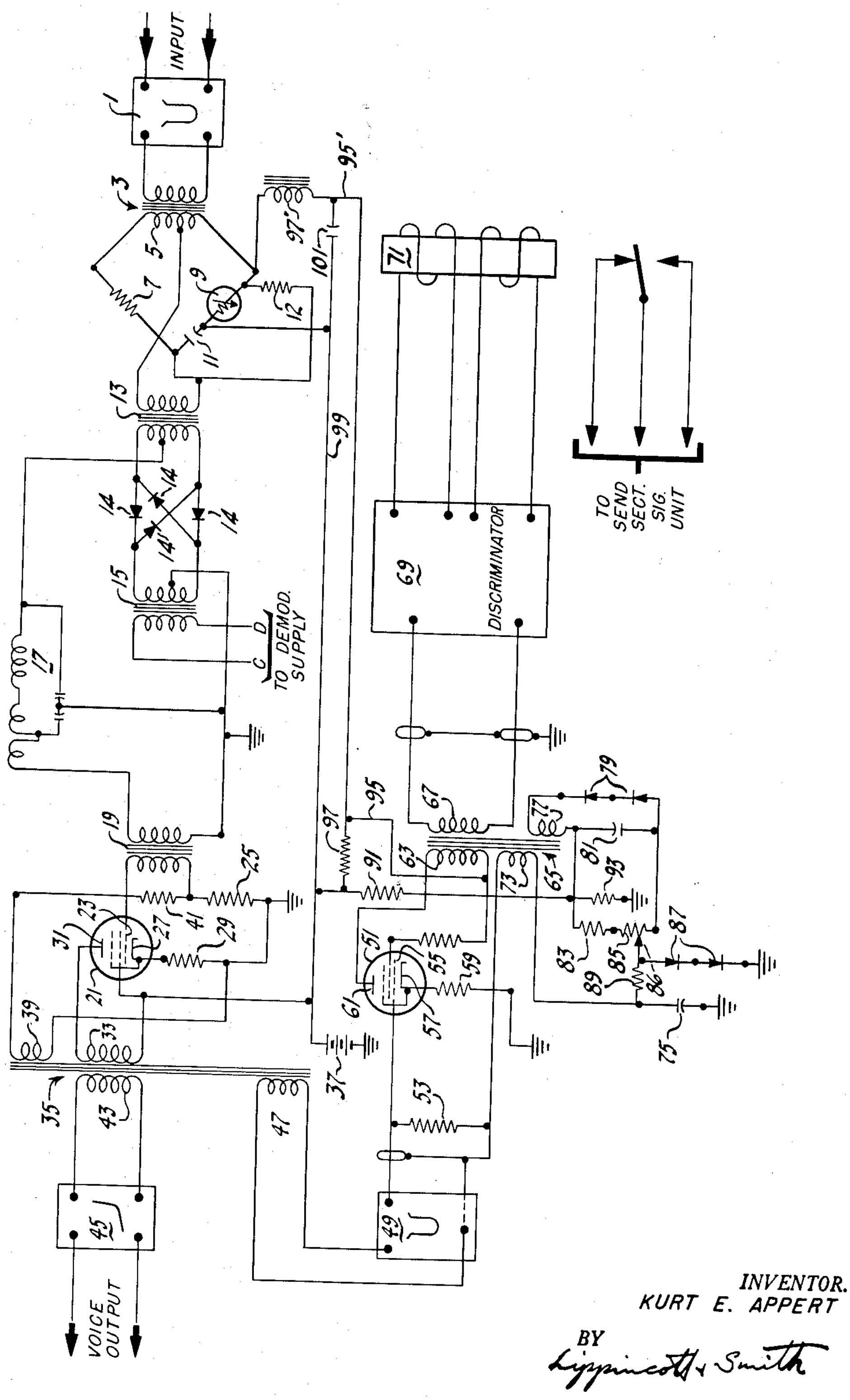
INVENTOR.
KURT E. APPERT
BY
Lippincott & Smith
ATTORNEYS Patented July 31, 1956

2,757,333

PILOT REGULATOR

Kurt E. Appert, Atherton Heights, Calif., assignor to Lenkurt Electric Co., Inc., San Carlos, Calif., a corporation of Delaware Application December 22, 1953, Serial No. 399,691

16 Claims. (Cl. 323—66)

This invention relates to pilot regulators for communication circuits which carry, in addition to the message signals for which such circuits are primarily established, auxiliary signals which are transmitted at a substantially constant level, the regulator being adapted to adjust the constants of the apparatus so as to deliver the pilot signals to further circuits (either an additional communications line or terminal equipment) at a substantially constant level, and maintain the transmission equivalent of the circuit, from microphone to telephone receiver substantially constant, irrespective of the amount of attenuation to which the signals may have been subjected in their transmission prior to reaching the pilot regulator. The auxiliary signals may serve the pilot function only; it is a feature of the present invention, however, that the auxiliary signals may be used to carry ringing, dialing, or other signals of intermittent or pulse type in addition to their regulating function, the auxiliary information thus carried being transmitted in the form of a frequency shift in the auxiliary signals so that the amplitude of the latter signals remains constant irrespective of the modulation thereof, the latter being of the frequency or phase modulation type.

Pilot regulators as a class are well known and are frequently employed in communication circuits. They are always so employed in long distance carrier current systems where the attenuation of the line varies with weather conditions and particularly where the transmission constants of the line differ for different channels within the carrier band. As a class such regulators comprise a network, the transfer coefficient whereof may be varied by external means; such a network may be passive, variable loss circuits, such as unbalanced bridge circuits containing at least one variable arm which by changing the degree of unbalance thereby changes the amount of loss between input and output, or various other "null networks" such as the twin T, bridged T which have similar characteristics, or they may be variable gain amplifiers. The latter type of apparatus is not usually favored since it is ordinarily desired to use negative feedback to stabilize the system and reduce distortion and such negative feedback usually resists changes in gain. It is possible, however, to accomplish the change in gain by varying the amount of feedback instead of the amplitude of the input signal and hence both types of variable circuit are practical. If the losser type of nework is used an additional, constant gain amplifier is ordinarily associated therewith. Other additional equipment, such as modulators or demodulators, for changing the frequencies of the transmitted signals, may be also incorporated in the equipment, but this is optional and may vary in accordance with the demands of the particular duty for which the regulator is used.

The signals from the variable device are fed to filtering means for separating the auxiliary signals and the message signals into separate channels. The pilot signals are utilized to operate some instrumentality which will change the gain of the variable-transfer-coefficient circuit in accordance with the amplitude of the pilot signals, increasing the gain or diminishing the loss therein when the amplitude of the pilot signals falls below the desired level and increasing the loss or decreasing the gain when the opposite effect occurs. Certain of these regulators are quite complicated. Some employ mechanical means for varying the gain in the loop between the regulator input and the operative instrumenality for the control. Others use entirely electrical means for exercising the control. The actual power available in the received pilot signal is very small. The change in the level of the pilot signal which is normally used to accomplish the change is smaller still. The level at which the pilot signal is received may vary between zero, representing a failure of the pilot signal, and the maximum to which the pilot signal may rise when transmitted at proper level through a circuit operating under optimum conditions.

Only a very small proportion of this range of level of received signal is actually useful, for if the received signal drops below levels within the normal range the regulator may attempt to compensate for this fact and in so attempting to increase the gain in the circuit, under circumstances where the pilot signal has failed entirely, may do mechanical or electrical damage, depending upon the nature of the regulator. The device must therefore be arranged for accepting the wide range of signal level between zero and the minimum probable signal without damage or over control and, at the same time, exercise control over the normal range of level of received pilot signals.

To obtain the loop gains necessary to accomplish the regulation relatively high amplifications must be used, with an accompanying tendency toward instability. In contrast to this it is very desirable that the loop gain should be constant. The actual control of the regulator has customarily been obtained through rectifying the pilot signal, usually in some type of discriminator circuit which will develop opposite potentials, depending upon whether the losses in the transmission circuit are rising or falling. This implies either a high degree of amplification of the pilot signals prior to discrimination or rectification or some type of D. C. amplifying circuit for controlling the transmission coefficient of the variable network.

Since many of the pilot regulators have been complex and expensive it has not usually been feasible to apply regulation in the individual channels of multichannel carrier current systems. Generally (although not universally) such systems have employed a single "flat" regulator, operative to change the level of all of the frequencies in the transmitted band uniformly, plus a "twist" or "slope" regulator, operative to change the gain as a function of frequency to compensate for the non-uniform transmission characteristics of the circuit at various frequencies.

It is obvious that it would be desirable to regulate the level of each channel individually, since this would reduce the duty imposed upon the over-all regulator and tend to compensate for any approximations in its design. Where complex regulators are used, embodying elaborate amplifiers and circuitry, such individual channel regulation has rarely been employed in the past. In telephone circuits, however, some form of signalling—dialing, ringing, or the like—must be employed in connection with each voice channel and this involves an auxiliary amplifier for raising the level of the auxiliary signals.

Among the objects of the present invention are to provide means for utilizing the auxiliary signals and the amplifier which operates upon them to regulate the level of all of the incoming signals in the channel; to provide means employing, for this purpose, a minimum of additional equipment, so that individual channel regulation becomes not merely feasible but economical, in that the individual channel regulators may permit the use of less expensive equipment for regulating the multichannel signals; to provide a pilot regulator having a high degree of "stiffness," and able to control incoming signals varying widely in level to a degree such that the output level varies by only a fraction of a db; to provide a pilot regulator wherein the amplifier which amplifies the pilot signals also acts, in effect, as a D. C. amplifier for the rectified error signal; to provide a pilot rectifier using D. C. amplification wherein the D. C. signal is not subject to drift, the amplifier being entirely free from D. C. instability and substantially independent of tube characteristics within the limits of the normal tolerance in the type of tube chosen for the amplifier; to provide a pilot regulator wherein the desired output level can be rigorously predetermined; to provide a pilot regulator which operates only within the limits of attenuation of incoming signals to which they are normally subjected and which does not attempt to increase amplification indefinitely upon the failure, for any cause, of the pilot signal; and, in addition, to provide a pilot regulator having the characteristics above described, which employs throughout amplifiers which are well stabilized by negative feedback so as to present a minimum of distortion and constant amplification of both voice and auxiliary signals, so that the additional functions imposed upon the auxiliary-signal amplifier in no way detract from its normal function with respect to such auxiliary signals.

Broadly considered, the invention comprises first, a network having a variable transfer coefficient adapted for connection to an incoming line. This network can be incorporated in or associated with additional equipment such as amplifiers, demodulators, etc., but preferably, because of economy and simplicity it will be a simple losser network, the preferred form being an unbalanced bridge wherein one arm includes a resistor, the impedance of which varies on passing therethrough an externally supplied current. If a demodulator is to be used in connection with the regulator, as will normally be the case when used for channel regulation, the demodulator can be coupled directly to the output of the variable network. Normally, with rectifier-type demodulators, additional amplification will also be required.

Any apparatus for demodulation, amplification, or other operation upon the incoming signals, follows the variable network, after which the mixed signals are supplied to a pair of filters for passing, respectively, the message and auxiliary signals. The latter filter is of the narrow band type, which selects pilot signals and rejects the message signals, supplying input signals to an amplifier which is preferably stabilized by relatively large negative feedback. Coupled in the output of the last-mentioned amplifier is a rectifier circuit which includes means for integrating the rectified pilot signals to supply a D. C. component from which substantially all the pilot frequency has been removed. A connection from the rectifier circuit leads back to the amplifier input, to bias the amplifier and thus change the D. C. component in its output circuit. The power supply for the amplifier is connected through the variable resistor or other regulating means in the variable network, means being provided to exclude from the resistor the alternating component in the supply, the connection being so made that the change in transfer coefficient of the variable network opposes any variation in signal level. Preferably there is also provided a source of constant potential which is substantially equal in magnitude to the minimum amplitude of the auxiliary signals in the output of the regulator amplifier. Means are provided for balancing the potential developed in the rectifier circuit against this constant potential, and for applying, as a bias to the amplifier tube, only the excess voltage developed above the comparative voltage level. Until the time that such excess is developed the tube is normally biased to carry its maximum normal operating current.

Considered from another point of view the invention comprises, in addition to the variable network, means for deriving a control potential from the output of the signalling amplifier, means for applying such control potential to vary the D. C. component in the amplifier output without substantially changing the A. C. component, and means for applying the D. C. component to control the transfer coefficient of the variable network.

The single figure of the drawing illustrates a preferred form of the invention as applied to an individual channel control.

In the particular system chosen for illustration, a multiplicity of channels is employed. Each voice frequency channel is single-sideband modulated upon a subcarrier, the subcarriers being separated uniformly by a 4 kc. spacing. Of the 4 kc. nominal channel width the lower 3200 cycles are allotted to the message frequencies, and the signalling frequencies are modulated upon a continuous wave which is shifted in frequency from 3400 cycles to 3550 cycles. At the transmitting end of the circuit either one or the other of these frequencies is transmitted continuously at substantially constant amplitude. In order to accomplish this separate modulators are used for the voice and signalling frequencies, so that the signalling frequencies will not be subjected to any limiting or compression which may be desirable for the voice frequencies; the actual method of insuring constant signalling frequency level is not, however, a part of this invention.

Four voice channels are individually modulated on subcarriers which may be of either 8, 12, 16, 20, or 24 kc., either the 8 kc. or 24 kc. carrier being omitted in any one group, depending upon whether the upper or lower sideband is to be transmitted; in any event the total band width of the four-channel group is from 8 to 24 kc. For the purpose of description it will be assumed that the particular regulator to be described is that associated with a channel using an 8 kc. subcarrier, the upper sideband of 8 to 12 kc., mixed with the upper sidebands carrying the signals in the other channels being supplied to the terminals of the equipment.

Signals modulated in the manner described are received from the communication circuit through a band-pass filter 1, which selects the particular 4 kc. band destined for the channel under consideration. The signals so received may have been subjected to prior demodulations or frequency shifts for other purposes, which are not germane to the present invention.

From the filter 1 the signals are fed to a transformer 3, the secondary whereof is center-tapped to form two arms of a bridge circuit, the input signal being effectively applied across one diagonal of the bridge. The other two arms of the bridge comprise, respectively, a linear resistor 7, comprising a fixed arm, and a thermistor 9 connected in series with a blocking condenser 11. In this particular instance the thermistor and condenser are shunted by a resistor 12.

The output circuit of the network is connected across the other diagonal of the bridge, one terminal of the output transformer 13 being connected to the center tap of the secondary 5 of the input transformer while the other terminal of the transformer 13 connects between the blocking condenser 11 and the resistor 7. The impedance of the parallel path including thermistor 9 and the resistor 12 is in this case slightly lower than that of the resistor 7 when minimum control current is supplied to the thermistor. When a greater direct current is passed through the thermistor its impedance drops, tending to unbalance the bridge further and so increase its transfer coefficient, it being apparent that at complete balance no signal would be delivered from the input transformer 3 to the output transformer 13. The transfer coefficient of the bridge network is thus a sensitive function of the current through the thermistor. The circuit arrangements for supplying this current will be described in detail hereinafter; at present the path of the signals through the apparatus will be traced in order.

The transformer 13 forms one input for a double-balanced ring demodulator circuit, comprising a bridge of four rectifiers 14, such as germanium diodes, copper oxide rectifiers, or the like. The rectifiers are arranged unidirectionally around the ring or bridge in accordance with well known practice. The other input to the demodulator is a transformer 15, the primary of which is fed with the 8 kc. demodulating frequency from a suitable source which is not shown. The output circuit of the demodulator connects to center taps on the secondaries of transformers 13 and 15, in accordance with usual practice.

Demodulation components from the demodulator pass through a low-pass filter 17 having a 4 kc. cutoff. Irrespective of the carrier frequency on which the channel signals originally may have been modulated, this filter passes the band including both message and signalling frequencies, to remove the upper sideband resulting from the demodulation. The output of the filter is connected to a matching transformer 19 which feeds an amplifier tube 21. In the present instance this tube is a pentode having the characteristics of that designated as "6AK5." One secondary terminal of transformer 19 is connected to the control grid 23 of this tube. The other secondary terminal of the transformer 19 connects to ground through a feedback resistor 25. The cathode 27 of tube 21 is also connected to ground through the usual cathode-biasing resistor 29. The anode 31 connects through the primary 33 of a transformer 35 to a source of anode current, illustrated as a battery 37 but which, in practice, may be any suitable source. The screen grid of tube 21 connects directly to this source which, in the particular device described, supplies a constant potential of 130 volts.

Transformer 35 is provided with a number of output windings. A small winding 39 connects between ground and a resistor 41 which, in turn, connects to the ungrounded side of resistor 25, the winding 39 being so poled as to produce a negative feedback for stabilizing and minimizing distortion in tube 21. Illustratively, the net gain provided by the amplifier 21 may be of the order of 40 db after a feedback in the neighborhood of 12 db. A second output winding 43 on transformer 35 connects with a low-pass filter 45, which cuts off quite sharply between the upper edge of the voice band at 3200 cycles and the minimum signalling and pilot frequency of 3400 cycles. The output of this filter connects to the ordinary voice frequency terminal equipment with which this invention is not concerned.

The third output winding 47 of transformer 35 connects to a narrow-band-pass filter 49. This filter is designed to pass the signalling frequencies of 3400 and 3550 cycles with equal attenuation. Preferably a high impedance, top connected filter is used in this location to feed the selected signals to a signalling and control amplifier tube 51 at a relatively high voltage level. A terminating and biasing resistor 53 connects across the output of the filter 49, the high side of which also connects to control electrode 55 of tube 51. The cathode 57 connects to ground through the usual cathode biasing resistor 59. The anode 61 connects to the primary 63 of a transformer 65, the low side of primary 63 connecting back to the common anode supply 37 through circuits which will be described in detail later.

One secondary winding 67 of transformer 65 connects to a discriminator 69 which demodulates the frequency-shifted signals and feeds them to a differential relay 71. Signals developed by the relay are fed to the switchboard for use in the ordinary manner. A second winding 73 on the transformer 65 connects to A. C. ground, in this case through a blocking condenser 75, and to the low potential end of the resistance 53 and thus to the control grid 55. It may be noted that this particular arrangement gives a power gain, after feedback, of about 25 db from the amplifier 51, the negative feedback supplied to the tube from the winding 73 being in the neighborhood of 20 db. The amplifier is therefore extremely stable and its gain is constant to within a fraction of 1 db irrespective of the individual characteristics of the specific tube used and of the changes in anode current through which regulation is effected.

It may be noted that as thus far described the equipment differs from that which would be used in the same channel without individual channel regulation only in the use of the variable network which immediately follows the receiving filter, and that this takes the place of a resistive pad which would otherwise be employed to set the level of the signals fed to the demodulator and thence to amplifier tube 21. An additional signalling amplifier would be used in any event, and the difference between such amplifier and that here employed, so far as manufacturing costs are concerned, would lie primarily in the transformer 65, which in this case carries one (or possibly two) extra windings, since some other method of stabilizing through negative feedback might be used and the winding 73 omitted. With the exception stated, the circuit is substantially conventional.

The additional winding which is used is an additional secondary coil 77. This supplies a rectifier circuit, which in the case shown comprises a pair of contact rectifiers 79 connected in series. The series arrangement of two rectifiers is purely a precautionary measure, to increase the back voltage which may be safely applied across the contact rectifiers. An integrating condenser 81 is connected in series with the rectifiers, as viewed from the coil 77. A resistive circuit, comprising, in the present case, a fixed resistor 83 in series with a resistor 85 having a variable tap 86 connects across the condenser 81.

A clamp circuit, also comprising a pair of rectifiers 87, connects from the tap 86 to ground, the rectifiers being so poled as to pass current when the tap is positive and to offer very high resistance when the tap is negative to ground. The tap also connects through a resistor 89 to the low potential end of winding 73.

Means are provided for applying to the rectifier circuit a comparison voltage of substantially fixed value. In the present case this is derived from the common anode supply 37, through a resistor 91 which connects to the terminal of condenser 81 opposite to that directly connected to the rectifier 79. A further resistor 93 connects from the junction of resistor 91 and condenser 81 to ground. In the example shown, resistor 91 has resistance of approximately 62,000 ohms, whereas resistor 93 has a value of about 8,000 ohms. There therefore can be applied, between one side of the integrating condenser 81 and ground, about 11.5% of the total 130 volts from the supply 37, or 15.2 volts. When no current is flowing in the rectifier circuit a second path to ground is afforded through resistor 83, resistor 85 as far as the tap 86 and the clamp rectifiers 87. In the apparatus illustrated a 33,000 ohm resistor 83 is used and a 25,000 ohm resistor 85, the parallel path to ground therefore may have a resistance of anywhere between 33,000 ohms and 58,000 ohms. Current flowing in this path can reduce the drop across resistor 93 to from 11.5 to 12.5 volts, depending on the setting of the tap 86. As long as this situation obtains the tap 86 and hence the control electrode 55 to which it connects are at ground potential and the grid-cathode bias of tube 51 is that due to the drop through the cathode resistor 59. The latter is so chosen as to provide maximum normal tube current, in this case approximately 10 to 11 ma. with a bias voltage of 1.3 to 1.4 volts.

The voltage across resistors 83 and 85 is effective as a back-bias on rectifiers 79. Therefore when a pilot signal is received no current is passed until the amplitude rises above the drop across these two resistors. When the pilot amplitude does rise above this value current flows, increasing the drop until that produced by the rectifier current alone is equal to that produced by the current from source 37 alone across resistor 93. At this point the direction of the voltage across clamp rectifiers 87 reverses and they cease to conduct. Hence resistors 83 and 85 no longer offer a parallel path to ground and the rectifier circuit is related to ground potential only through the 15.2 volt drop across resistor 93; the currents from the rectifier circuit and the source 37 no longer have a common path.

It is at this value of pilot signal that the regulator takes control. Further increase in pilot amplitude, increasing the rectifier current and the drop across resistors 83 and 85 depresses the potential of contact 86 below ground potential and thereby applies a negative bias to the control electrode and decreases the anode current of tube 51. Condenser 81 may have a capacity of the order of 0.1 microfarad, which, in series with the two resistors, gives the integrating circuit a time-constant of a little less than 1/100 second, which is adequate to remove substantially all of the pilot frequency components from the rectified signals. By varying the position of the contact on resistor 85, the signal voltage at which additional negative bias is applied to the grid of tube 51 is adjusted.

Because of the heavy negative feedback in the circuit of the tube 51 the change in the mean anode current of the tube is substantially without effect upon the amplification. This mean current or D. C. component of the amplifier output flows through lead 95, which is connected to the main anode supply 37 through two paths. One of these is through a resistor 97 which is here of the order of 8,000 ohms but which may in other cases vary from this value or be omitted entirely since its principal function is to adjust the current flowing through the thermistor to a desired working range. A major proportion of the D. C. component flows through lead 95′, a choke coil 97, and thence to the thermistor 9 in the bridge circuit and back to the main anode supply bus 99. A bypass condenser 101, connected between leads 95′ and 99, passes the alternating component of the anode current but blocks the D. C. component. The choke 97, on the other hand, substantially prevents the A. C. component from reaching the bridge circuit or the currents from the bridge circuit from bypassing the thermistor.

The thermistor 9 is in this case one having an operating range of resistance between about 1500 ohms and 3000 to 3500 ohms with varying control currents therethrough. When shunted by the resistor 12 (about 2000 ohms) the effective resistance of the arm of the bridge in which it is included can vary between a minimum of 866 ohms and a maximum of about 1230 ohms. The resistance used in the bridge arm 7 is 1300 ohms, so that the attenuation in the bridge circuit can vary over a range of from 12 to about 50 db. In the service which the illustrative apparatus is designed to handle, the normal range is 14 db, with an attenuation varying between a minimum of 17 db and a maximum of 31 db, well within the limits of the network. The variation in output level in the circuit shown is from about ±0.5 db to ±0.7 db, giving a stiffness ratio of from 14:1 to 10:1, depending on the setting of contact 86. Higher stiffness ratios may easily be achieved, but because of operational difficulties which may be encountered when higher stiffness ratios are used the range adopted is deemed best for the purposes of this application of the apparatus.

The thermistor 9 is, in this instance, of the negative resistance characteristic type, decreasing in resistance with increase of control current. The invention is not limited to use of a thermistor of this character. If the resistance 7 be made of lower value than the normal resistance in the adjacent arm a thermistor having a positive temperature-resistance characteristic may be used to produce precisely similar results.

The type of losser network employed in this particular embodiment of this invention is, it will be noted, more or less conventional. Other types of variable-transfer-coefficient network may be used, with reasonably satisfactory results, the primary advantage of that shown being its economy. The value of the present invention resides in the combination of such a network with the features of the circuits supplied by the amplifier tube 51. The 20 db negative feedback applied to the amplifier makes it extremely stable; a 2:1 change in amplification factor of the tube makes only about 2% change in the voltage amplification. Even with pentodes of the sharp cut-off type, which is that preferably used, the amplification constant varies with grid bias, but because of the stabilizing effect of the feedback the change in amplification factor over the range of bias used is negligible. Hence the variations in amplitude of the pilot frequency signals as they appear in the output circuit reflect with great accuracy the changes in output level of the signals in the channel. The comparison voltage supplied across the resistor 93 can also be adjusted with great accuracy, using a regulated power supply (desirable for other reasons) and selecting reistors 91 and 93 of proper relative values. This sets the lower level of the pilot signal which must be received before the control takes hold at all. When the signal drops below this level the amplification does not increase but remains constant; the actual working range through which the control voltage may swing for a level variation of ±0.7 db is from about 15½ to about 18 volts, or a change of about 17%. It is the working range and the working range only which affects the tube 51 and the change in anode current produced by this small change in control voltage may be over 250%. Tube 51 acts as a D. C. amplifier for the control voltage, but there is no question of drift involved since the normal value of current is set by the self-biasing resistor 59. This value may be set anywhere between the desired operating level and the safe current carrying capacity of the tube, and since the control does not take over until the maximum desired amplification is reached this does no harm, so that to all intents and purposes the effect of differences in tube parameters is eliminated.

For the particular circuit here illustrated the 24 db mean loss introduced by the variable network is of no consequence. The frequency shifts and other operations on the signal which precede the individual channel units are such that the available level at the input of the channel unit is much higher than can be conveniently handled by the modulator. For this reason attenuating pads would be necessary in the circuit, prior to the modulator, in any event. If this situation did not obtain it is readily possible to utilize variable networks involving smaller losses, or to connect the variable loss network in the negative feedback loop of an amplifier.

The sensitivity of the regulator is under control by varying the position of the movable contact on resistor 85. With no current flowing in the rectifier circuit this contactor is at ground potential irrespective of its setting. The current which flows in the resistors 83 and 85 is a constant, for constant excess voltage over the comparison voltage, irrespective of the setting of the movable contact. The portion of the voltage drop through these resistors which is applied as a bias can, however, be varied between the full voltage developed and about 57% of that voltage, with other values for resistors 83 and 85 further flexibility of adjustment can be secured if desired.

With the circuit constants shown, a range of about ±0.5 db is available for changing the mean output level about which regulation is effected. Raising the mean output level decreases the sensitivity of control, and vice versa. With the particular tube and constants shown, minimum sensitivity gives a control range of something less than ±0.9 db, while maximum sensitivity setting gives a range of something less than ±0.5 db, with the 14 db range of input levels mentioned before. The actual available working range of the system is wider than this, and, of course, can be varied to meet particular conditions. The center value of attenuation can be changed, without changing the sensitivity, by varying the value of the comparison voltage.

An outstanding feature of the system is the greatly different gains of the tube 51 with respect to the A. C. and D. C. components applied to its grid. The feedback of the alternating component makes the voltage amplification factor of the amplifier for this component substantially constant at 10. Since the control of the variable network is a function of current, however, and not of voltage, it is current gain which is important. The 1 db total change in output of the variable network represents a current change in the rectifier circuit of .034 milliampere. The current change in the anode circuit of the tube 51, however, is 4.7 milliamperes for this same change, a current gain of 138 fold. In the present case this is much greater than necessary, and the current through the thermistor is therefore reduced to its proper working range by the resistors 12 and 97, the first in the network itself and the second shunting the network. By variation or omission of either of these resistors, or equivalent resistors in networks of different types, almost any response characteristic desired may be attained.

Among the numerous variants which may be employed within the scope of the invention is that wherein the integrated voltage from the rectifier circuit is applied to bias the tube positively instead of negatively, increasing instead of decreasing the direct component in the anode circuit of tube 51. The required changes in the circuit shown are slight: all the rectifiers are reversed in polarity, and the comparison voltage is derived from a negative instead of a positive source. The thermistor in the variable network then is either one having a positive instead of a negative current-resistance characteristic, or has a higher zero-current resistance than the adjacent arm of the bridge.

The over-all performance of the regulator thus modified may be made substantially identical with that described in detail above. The circuit is of interest in that it emphasizes the independence of the A. C. and D. C. functioning of the tube. Considered with respect to the D. C. operation the variant circuit is regenerative, in that with pentodes of the general type here described the transconductance and hence the amplification coefficient increases with decreased negative bias on the grid. Within the range for which the circuit described is designed the amplification coefficient may vary over a range in the neighborhood of 2:1. The negative feedback of the A. C. component holds the effective amplification within the same narrow limits as in the circuit initially described, and since the D. C. control bias is derived from the A. C. it is held within the prescribed limits exactly as before. Considered as a whole the circuit is degenerative in either case, since if the anode current of the tube is increased with increased signal amplitude the action of the variable network is reversed so as still to decrease amplification.

While values of circuit constants, attenuations, amplification factors and the like have been given in this specification it should be clear that these figures are intended only to illustrate the capabilities of the invention and that all such values can be greatly changed to adapt it to other working conditions. No limitation of the invention to the form illustrated is intended or to be implied, all intended limitations being specified in the claims which follow.

What is claimed is:

1. A regulator for a communication circuit carrying message signals mixed with pilot signals continuously transmitted at a substantially constant level, comprising a filter for selecting said pilot signals from the mixed signals received from said communication circuit, a network having a transfer coefficient variable in response to variation in an externally supplied current and connected to supply said filter and adapted for connection to said communication circuit, an amplifier connected in the output circuit of said filter and including an input circuit and an output circuit and means for coupling said output and input circuits to provide a negative feedback for maintaining the gain of said amplifier substantially constant, a rectifier coupled to receive the alternating component only from the output circuit of said amplifier, means for integrating the rectified signals to provide a voltage substantially free from pilot frequency components, connections from said integrating means to the input circuit of said amplifier to supply said voltage thereto as a bias for varying the D. C. component of said amplifier output, means for selecting said D. C. component from the output circuit of said amplifier and connections for supplying said D. C. component to said network as said externally supplied current to vary the transfer coefficient of said network as an inverse function of the magnitude of said bias voltage.

2. A regulator for a communication circuit carrying message signals mixed with pilot signals continuously transmitted at a substantially constant level, comprising a filter for selecting said pilot signals from the mixed signals received from said communication circuit, a network having a transfer coefficient variable in response to variation in an externally supplied current and connected to supply said filter and adapted for connection to said communication circuit, an amplifier connected in the output circuit of said filter and including an input circuit and an output circuit and means for coupling said output and input circuits to provide a negative feedback for maintaining the gain of said amplifier substantially constant, a rectifier coupled to receive the alternating component only from the output circuit of said amplifier, means for integrating the rectified signals to provide a voltage substantially free from pilot frequency components, connections from said integrating means to the input circuit of said amplifier to supply said voltage thereto as a bias for varying the D. C. component of said amplifier output, and a clamp circuit for maintaining the bias of said amplifier at a fixed value when the voltage of said integrating circuit falls below a selected minimum.

3. A regulator for a communication circuit carrying message signals mixed with pilot signals continuously transmitted at a substantially constant level, comprising a filter for selecting said pilot signals from the mixed signals received from said communication circuit, a normally unbalanced bridge circuit connected to supply said filter and adapted for connection to said communication circuit and including in one arm thereof an impedance variable in response to the current carried thereby, a negative feedback amplifier having an input circuit connected to said filter, a vacuum tube having a control electrode connected in said input circuit and an output circuit wherein the current varies in accordance with variations in the voltage applied to said control electrode, a rectifier coupled to receive the alternating component only from the output circuit of said amplifier, means for integrating the rectified signals to provide a voltage substantially free from pilot frequency components, connections from said integrating means to the input circuit of said amplifier to supply said voltage thereto as a bias for varying the D. C. component of said amplifier output, means for selecting said D. C. component from the output circuit of said amplifier, and connections for supplying said D. C. component to the variable impedance in said bridge arm to vary the transfer coefficient thereof an inverse function of said bias voltage.

4. A pilot regulator as defined in claim 3 including a clamp circuit for maintaining the bias applied to said amplifier at a fixed value when the voltage from said integrating circuit falls below a selected minimum.

5. A pilot regulator for a communication circuit carrying message signals mixed with pilot signals transmitted at a substantially constant amplitude comprising a network having a transfer coefficient variable in response to an externally supplied current and terminals for connection to said communication circuit, filter means connected in cascade with said network for separating said message signals and pilot signals into separate circuit paths, a vacuum tube including a cathode and a control electrode connected in said pilot signal circuit path and an anode, means for supplying to said cathode and anode a direct current the intensity whereof is dependent upon the potential applied between said control electrode and said cathode, an output circuit connected in series with said anode, a rectifier circuit coupled in said output circuit so as to derive therefrom only pilot frequency components present therein, means in said rectifier circuit for integrating the rectified pilot signals and substantially remove therefrom pilot frequency components, a connection for applying the integrated signal voltage between said control electrode and cathode to vary the D. C. component in said vacuum tube, and connections from said output circuit for suplying said D. C. component to said network for varying the transfer coefficient thereof as an inverse function of the intensity of the received pilot signals.

6. The invention as defined in claim 5 wherein said network comprises an unbalanced bridge including a thermistor in one arm thereof, the connections for said D. C. component being arranged to pass said D. C. component through said thermistor.

7. The invention as defined in claim 5 including connections from said output circuit to said control electrode to apply said pilot signals thereto as a negative feedback.

8. The invention as defined in claim 5 including means for supplying a substantially constant comparison voltage, means for comparing said comparison voltage with the voltage of said integrating means, and means for restricting the voltage applied from said integrating means to said control electrode to the portion thereof in excess of said comparison voltage.

9. An individual channel regulator for a communication circuit carrying message signals and auxiliary signals transmitted at constant amplitude and shifted in frequency intermittently between values outside of the message signal band to convey information in addition to that transmitted by said message signals, comprising a network having a transfer coefficient variable in response to an externally supplied current and provided with terminals adapted for connection to said communication circuit, a band-pass filter connected in cascade with said network and having a pass-band including the frequencies within which said auxiliary signals are shifted and excluding frequencies within the band of said message signals, a vacuum tube amplifier connected to the output of said filter, an output circuit for said amplifier including a primary winding and a plurality of secondary windings, translating means for said auxiliary signals connected to one of said secondary windings, a rectifier connected to a second one of said secondary windings, a condenser connected to be charged from said rectifier and a resistor for discharging said condenser, said condenser and resistor having a time constant long in comparison with any of said auxiliary frequencies, means for supplying anode current for said amplifier connected in series with said transformer primary winding, a connection from said condenser for applying a voltage therefrom to the input of said amplifier to vary said anode current, and connections for applying the direct component of said anode current to said network to vary the transfer coefficient thereof as an inverse function of the amplitude of said auxiliary signals.

10. In a channel receiving terminal equipment for a communication system wherein signalling frequency waves are transmitted continuously together with message frequency waves, said terminal equipment including means for separating said signalling and message frequency waves into separate paths and an amplifier tube in the signalling frequency path for raising said signalling frequency waves to a power level adapted to operate signalling relays, the combination comprising means coupled to the output of said amplifier tube for deriving therefrom voltage waves proportional to the amplitude of said signalling frequency waves, means for rectifying the derived waves to develop a direct control voltage, connections for applying said control voltage as a bias to said tube in such sense as to reduce the direct component in the output current in said amplifier tube, and means responsive to changes in said direct component for controlling the amplitude of the message and signalling frequency waves as an inverse function of said direct component.

11. In a channel receiving terminal equipment for a communication system wherein signalling frequency waves are transmitted continuously together with message frequency waves, said terminal equipment including means for separating said signalling and message frequency waves into separate paths and an amplifier tube in the signalling frequency path for raising said signalling frequency waves to a power level adapted to operate signalling relays, the combination comprising means coupled to the output of said amplifier tube for deriving therefrom voltage waves proportional to the amplitude of said signalling frequency waves, means for rectifying the derived waves to develop a direct voltage, means for developing a substantially constant comparison voltage, means for comparing the derived direct voltage with said comparison voltage to develop a control voltage proportional to any excess of said derived direct voltage over said comparison voltage as a control voltage, connections for applying said control voltage as a bias to said tube in such sense as to reduce the direct component in the output current in said amplifier tube, and means responsive to changes in said direct component for controlling the amplitude of the message and signalling frequency waves as an inverse function of said direct component.

12. In a channel receiving terminal equipment for a communication system wherein signalling frequency waves are transmitted continuously together with message frequency waves, said terminal equipment including means for separating said signalling and message frequency waves into separate paths and an amplifier tube in the signalling frequency path for raising said signalling frequency waves to a power level adapted to operate signalling relays, the combination comprising means coupled to the output of said amplifier tube for feeding back negatively to the input thereof a sufficient alternating component to maintain the amplification thereof substantially constant, additional means coupled to the output of said tube for deriving therefrom an alternating voltage proportional to the amplitude of said signalling frequency waves, means for rectifying said alternating voltage to provide a direct control voltage which varies as a direct function of said alternating voltage, connections for applying said control voltage as a bias to said input circuit to vary the direct component in the output of said amplifier tube, and means responsive to variations in said direct component for varying the amplitude of the signalling and message frequency waves in said channel terminal equipment as an inverse function of the amplitude of said signalling frequency waves.

13. An amplifier comprising in combination with a vacuum tube including a cathode, an anode and a control electrode; an output circuit for said tube connected between the anode and cathode thereof, a feedback circuit coupled to said output circuit and adapted to apply only alternating components of voltage negatively between said cathode and control electrode, a second circuit coupled to said output circuit and adapted to derive only alternating components therefrom, a rectifier connected in said second circuit and integrating means in said rectifier circuit for deriving from the alternating components in said second circuit a direct voltage substantially proportional to the amplitude of said alternating components, connections for applying variations in said direct voltage between said cathode and control electrode to vary the direct component of current in said output circuit and a separate load circuit so connected to said output circuit as to derive said direct component therefrom.

14. The invention as defined in claim 13 including means for supplying a substantially constant comparison voltage, means for comparing said direct voltage to said comparison voltage, and means for applying only the excess of said direct voltage over said comparison voltage to vary the direct component of current in said output circuit.

15. In a channel receiving terminal equipment for a communication system wherein signalling frequency waves are transmitted continuously together with message frequency waves, said terminal equipment including means for separating said signalling and message frequency waves into separate paths and an amplifier tube in the signalling frequency path for raising said signalling frequency waves to a power level adapted to operate signalling relays, the combination comprising means coupled to the output of said amplifier tube for deriving therefrom voltage waves proportional to the amplitude of said signalling frequency waves, means for rectifying the derived waves to develop a direct control voltage, connections for applying said control voltage to bias said tube to vary the direct component in the output circuit thereof, and means responsive to variations in said direct component for controlling the amplitude of both the message and the signalling frequency waves as an inverse function of the magnitude of said control voltage.

16. An amplifier comprising a vacuum tube having a cathode, a control electrode and an anode, an input circuit for applying alternating potentials between said cathode and control electrode, an output circuit connected to said anode, a negative feedback circuit coupled from said output circuit back to said input circuit to maintain the gain of said tube substantially constant, a second circuit coupled to said output circuit to derive therefrom alternating components only, means for rectifying said components to develop a direct voltage proportional in magnitude thereto, connections for applying said direct voltage as a bias in said input circuit to said control electrode superimposed on the feedback of said alternating components to vary the direct component in the output of said amplifier in response to variations in the amplitude of the alternating components therein the amplification of said direct component being unaffected by the feedback of said alternating components and a separate load circuit connected to derive said direct component from said output circuit.

References Cited in the file of this patent

UNITED STATES PATENTS

| | | |
|---|---|---|
| 2,151,070 | Bartels | Mar. 21, 1939 |
| 2,152,618 | Wheeler | Mar. 28, 1939 |
| 2,204,973 | Steinmetz | June 18, 1940 |
| 2,321,986 | Brown | June 15, 1943 |